(12) United States Patent
Polus et al.

(10) Patent No.: US 10,391,751 B2
(45) Date of Patent: Aug. 27, 2019

(54) SPATIAL REFERENCE FILM IN CORE-STIFFENED COMPOSITE

(71) Applicant: The Boeing Company, Chicago, IL (US)

(72) Inventors: Jeffrey Edward Polus, Hillsboro, IL (US); Dylan Edward Polus, Glen Carbon, IL (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 15/133,912

(22) Filed: Apr. 20, 2016

(65) Prior Publication Data

US 2017/0305131 A1 Oct. 26, 2017

(51) Int. Cl.

| | |
|---|---|
| *B32B 37/12* | (2006.01) |
| *B32B 37/14* | (2006.01) |
| *B32B 7/12* | (2006.01) |
| *B32B 3/12* | (2006.01) |
| *B64C 1/12* | (2006.01) |
| *B64F 5/10* | (2017.01) |
| *B64F 5/60* | (2017.01) |
| *B64C 1/00* | (2006.01) |

(52) U.S. Cl.
CPC ............... *B32B 37/12* (2013.01); *B32B 3/12* (2013.01); *B32B 7/12* (2013.01); *B32B 37/14* (2013.01); *B64C 1/12* (2013.01); *B64F 5/10* (2017.01); *B64F 5/60* (2017.01); *B32B 2605/18* (2013.01); *B64C 2001/0072* (2013.01); *Y10T 428/24149* (2015.01); *Y10T 428/24612* (2015.01)

(58) Field of Classification Search
CPC ........... B32B 37/12; B32B 37/14; B32B 3/12; B32B 7/12; B34C 1/12; B34C 2001/0072
See application file for complete search history.

(56) References Cited

U.S. PATENT DOCUMENTS

| | | | | |
|---|---|---|---|---|
| 4,786,848 | A | 11/1988 | Nickerson | |
| 5,830,548 | A * | 11/1998 | Andersen | B28B 1/00 206/524.3 |
| 6,630,093 | B1 * | 10/2003 | Jones | B29C 70/088 264/136 |
| 2006/0172111 | A1 * | 8/2006 | Polus | B29C 70/088 428/73 |
| 2007/0164117 | A1 * | 7/2007 | Swiler | B05D 5/06 235/491 |

(Continued)

FOREIGN PATENT DOCUMENTS

EP 1719030 B1 11/2006

*Primary Examiner* — Laura C Powers
(74) *Attorney, Agent, or Firm* — Miller, Matthias & Hull LLP (57) ABSTRACT

A core-stiffened composite product has an interior core and layers of composite laminates sandwiched together about the core. The core-stiffened composite product includes at least one layer of adhesive film containing a visual target spatially scanned by an automated tracking system to produce a dimensionally corrected reference volume to collate successive layers of film as applied to the interior core. The visual target is positioned to assure an as-designed alignment of each applied layer of laminate onto the core to minimize cumulative tolerance build-ups during a laminate layering process. At least one layer of adhesive film remains within the completed composite product.

17 Claims, 6 Drawing Sheets

(56) References Cited

U.S. PATENT DOCUMENTS

| | | | |
|---|---|---|---|
| 2008/0149769 A1* | 6/2008 | Koch | B64C 1/062 244/121 |
| 2008/0233344 A1* | 9/2008 | Grob | B29C 70/088 428/116 |
| 2009/0072086 A1* | 3/2009 | Smith | B32B 3/12 244/119 |
| 2011/0205326 A1* | 8/2011 | Roth | B41J 2/32 347/171 |
| 2013/0213685 A1* | 8/2013 | Gaw | B29C 70/64 174/2 |

* cited by examiner

SPATIAL REFERENCE FILM IN CORE-STIFFENED COMPOSITE

FIELD

The present disclosure relates generally to composite layering processes utilizing automation, and more specifically to use of film adhesives having visual target references included within composite layers to compensate for fabrication deviations due to tolerance buildups.

BACKGROUND

Modern aircraft construction has become more efficient and cost-effective, in part because composite layered structures are now commonly used in commercial airliners. Composite structures are both stronger and lighter in weight than conventional aluminum structures previously employed in the manufacture of airliners.

One issue with composites, however, has involved the use of automation in fabricating core-stiffened composite structures, such as and including those designed for use in exterior skins and control surfaces of aircraft. The designs and builds of such composites generally require layering of various prepreg composite fiber materials for achieving satisfactory final composite structures. Those skilled in the art may appreciate that dimensional deviations of parts from their design parameters occur during fabrication, and are particularly associated with processes involving relatively thick honeycomb cores. Such deviations, primarily involving the cores per se, can result from even simple factors such as variations of temperature and humidity.

SUMMARY

In a first form of the disclosed embodiments, a core-stiffened composite product has an interior core and layers of composite laminates sandwiched together about the core. The core-stiffened composite product includes at least one layer of adhesive film containing a visual target spatially scanned by an automated tracking system to produce a dimensionally corrected reference volume to collate successive layers of film as applied to the interior core. The visual target is positioned to assure an as-designed alignment of each applied layer of laminate onto the core to minimize cumulative tolerance build-ups during a laminate layering process. At least the one layer of adhesive film remains within the completed composite product.

In a second form of the disclosed embodiments, an aircraft component has an interior core and layers of composite laminates sandwiched together about the core. The aircraft component includes at least one layer of adhesive film containing a visual target spatially scanned by an automated tracking system to produce a dimensionally corrected reference volume to collate successive layers of film as applied to the interior core. The visual target is positioned to assure an as-designed alignment of each applied layer of laminate onto the core to minimize cumulative tolerance build-ups during a laminate layering process. At least the one layer of the adhesive film remains within the completed aircraft component.

In a third form of the disclosed embodiments, a process of manufacturing a lightweight aircraft core-stiffened composite product, containing an interior core and layers of laminates sandwiched about the core, includes steps of placing a first prepreg laminate layer on a work surface of a composite layup tool. Next, a first adhesive layer is placed over the first prepreg laminate, and a core is then placed over the first laminate. A second adhesive layer is applied over the core, the second adhesive layer containing a visual laser target. An optical scanner is then used to track the visual target to generate a spatial reference for accurate positioning of a second prepreg laminate layer. Finally, the second prepreg laminate layer is applied over the second adhesive layer in accordance with a dimensionally corrected reference volume generated by the optical scanner.

All features, aspects, functions, and advantages disclosed herein can be achieved independently in various embodiments or may be combined in yet other embodiments, the details of which may be better appreciated with reference to the following description and drawings.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description is intended to provide both apparatus and methods for carrying out the disclosure. Actual scope of the disclosure is as defined by the appended claims.

Figure 1:
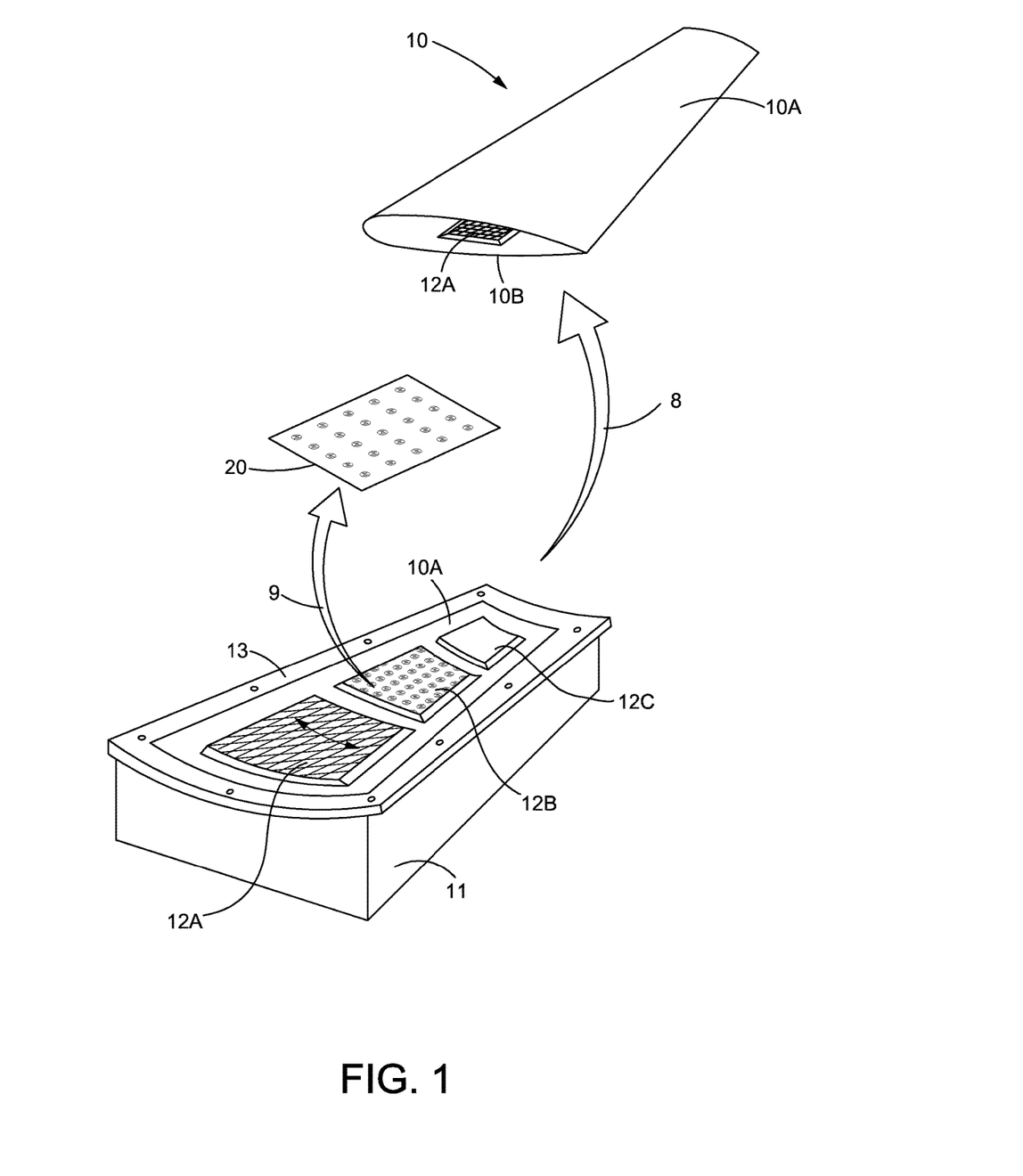
FIG. 1 is a schematic perspective view of a layup tool, and a core-stiffened composite product that may be manufactured utilizing such a tool, in accordance with the present disclosure.

In FIG. 1, a core-stiffened composite product 10 is displayed. The composite product 10 may be a component such as a skin, spoiler, flaperon, wing panel, or stabilizer, of an aircraft (not shown). The core-stiffened composite product 10 includes an interior core 12, which may be formed of a honeycomb or other load supporting material, and which may be manufactured on various tools, including the layup tool 11 having a tooling surface 13, as shown. An arrow 8 indicates that subsequently joined portions 10A and 10B of the composite product 10 (as explained below) may be lifted from the tooling surface 13 during a manufacturing assembly process to be described.

Figure 2:
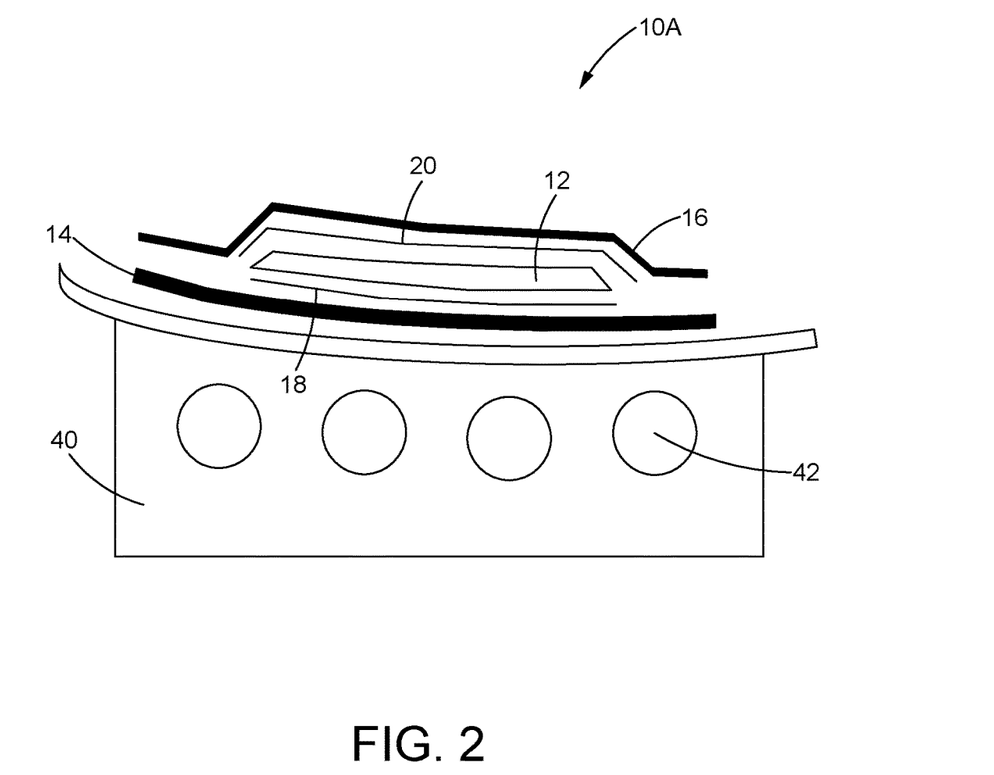
FIG. 2 is a cross-sectional view of a portion of the core-stiffened composite product of FIG. 1, shown positioned on a bond tool just prior to its removal, in accordance with the present disclosure.

Referring now also to FIG. 2, the composite product 10 may be manufactured as upper and lower reversely identical portions 10A and 10B of the composite product 10. The portions 10A and 10B may thereafter, for example, be adhesively secured together to define upper and lower surfaces of the composite product 10 of FIG. 1. Each individually made portion 10A and 10B (only portion 10A is shown in FIG. 2) is comprised of initially separate laminates formed of prepreg layers having an interior core 12 that is comprised of individually spaced and/or segmented and/or tapered core components 12A, 12B, and 12C (FIG. 1) in the described embodiment. In each portion 10A, 10B, the interior core 12 overlies a first composite laminate 14 initially placed atop of the tooling surface 13. The interior core 12 is then secured to the composite laminate 14 by means of an outer film adhesive layer 18 that is placed directly over the first composite laminate 14.

In the manufacture of aircraft components, special care may be required to properly align successive layers of core and composite materials. This initiative can be particularly challenging when the core is substantially thicker than the layers to which the core is bonded. For example, if critical dimensions are not appropriately accounted for, the core geometry can be altered by automated mechanisms utilized to place successive layers.

For this purpose, and to the extent that the core may have a thickness of about one order of magnitude greater (e.g. 5 to 15 times) than the thickness of any attached composite layer, this disclosure utilizes a layer of adhesive film containing visual tracking targets which may be scanned by an implement capable of reading positions within the thousands of an inch, such as an optical scanner in a spatial tracking system to be described.

Figure 3:
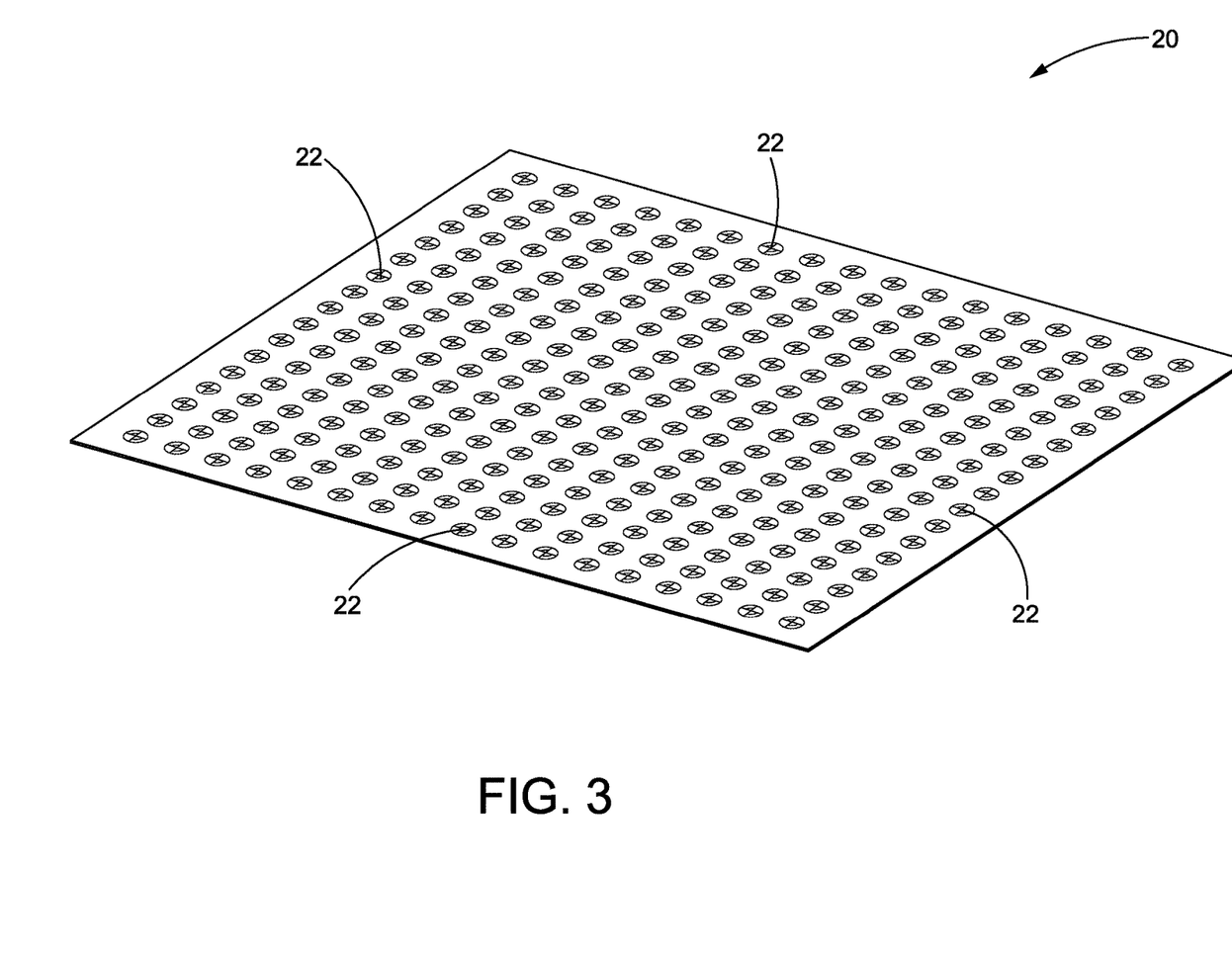
FIG. 3 is an adhesive film layer, as shown in FIG. 1, including visual targets for spatial tracking, in accordance with the present disclosure.

Referring now also to FIG. 3, an inner adhesive film layer 20 (as shown in FIG. 1 with relationship arrow 9) incorporates visual targets 22 for assuring proper placement of subsequently applied composite layers. The film layer 20 is applied over the interior core 12, and subsequently scanned using a spatial tracking system, such as a tracking system 26 (described hereinbelow in reference to FIG. 5) to assure that the composite laminate 16 is placed with precision as an inner layer of the composite portion 10A (or portion 10B).

Figure 4:
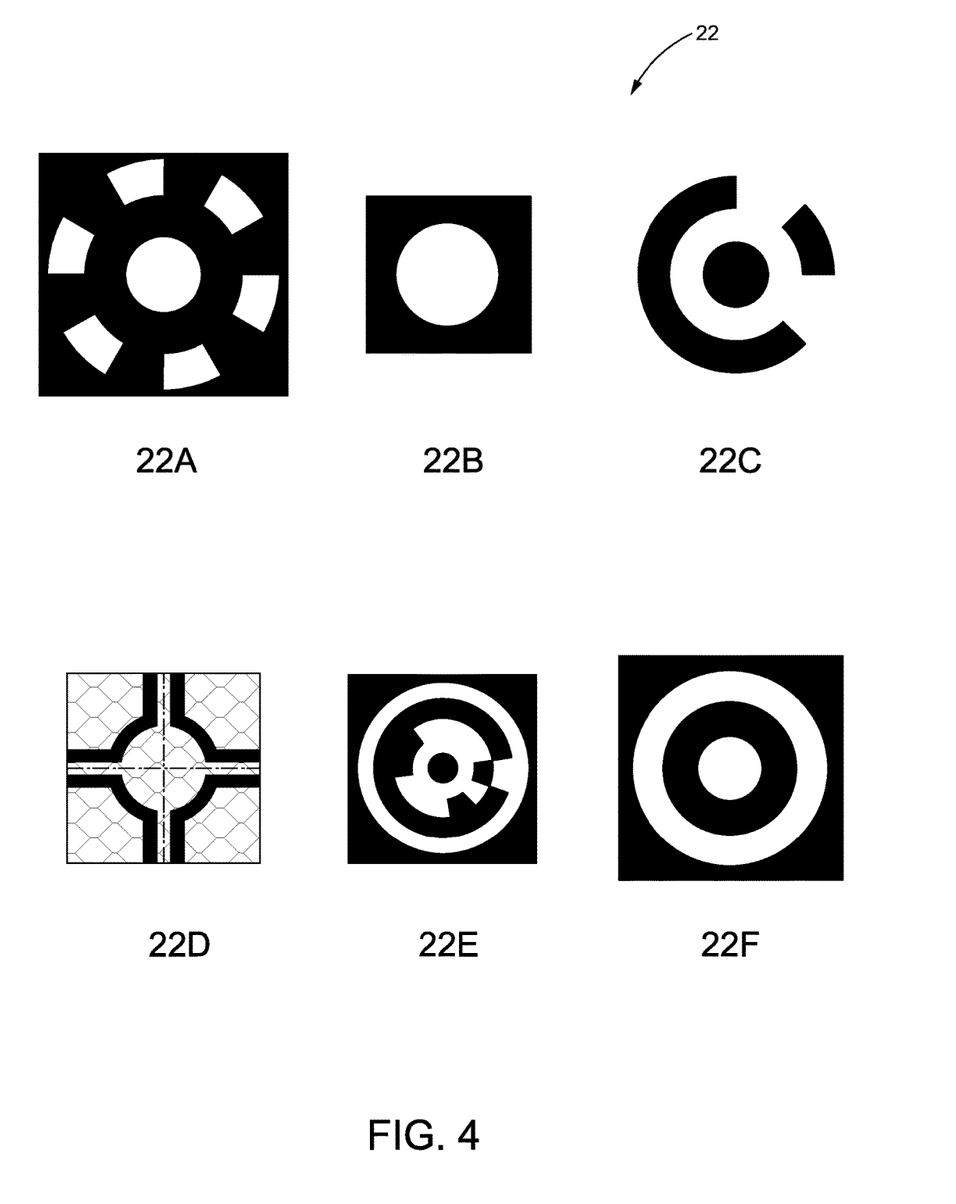
FIG. 4 is a plurality of exemplary visual targets that may be incorporated within the adhesive film layer of FIG. 3, in accordance with the present disclosure.

FIG. 4 displays a variety of visual tracking targets 22 A-F, as examples only of styles and types of targets which modern scanners, such as optical scanners, may effectively read, for purposes of this disclosure.

Figure 5:
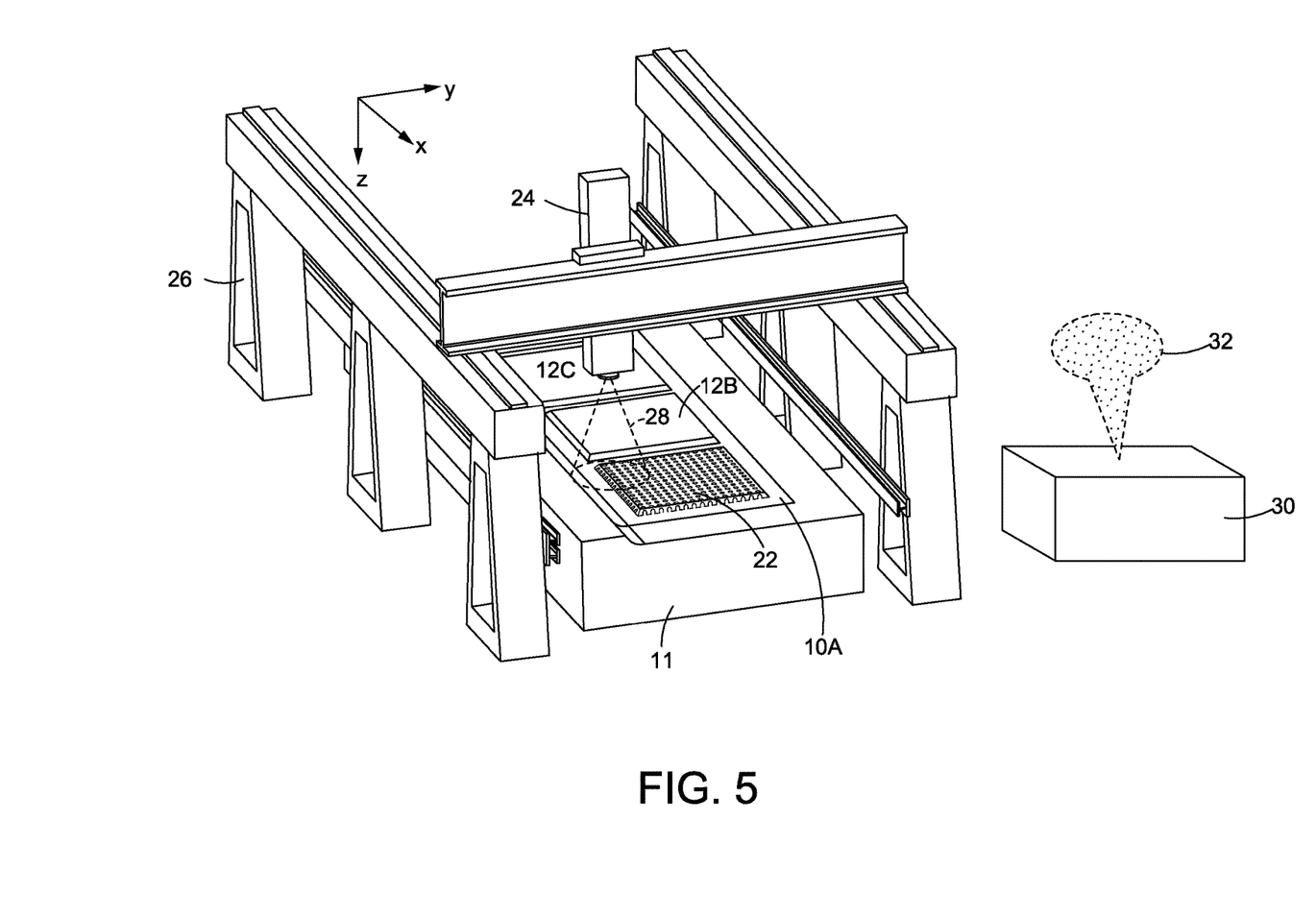
FIG. 5 is a perspective view of a visual tracking system, including an optical scanner for tracking visual targets in the adhesive film layer of FIG. 3.

Referring now to FIG. 5, the automated tracking system 26, shown positioned over the layup tool 11, enables an optical scanner 24, such as a laser, to effectively read positions of tracking targets 22 on the film layer 20. A computer system 30, shown only schematically, is used to generate a spatial reference point cloud 32, also shown schematically. The point cloud 32 thus provides a computer-generated frame of reference for assuring an accurate, i.e. dimensionally corrected, placement of the composite laminate 16 on the honeycomb core 12. The optical scanner 24 has a sight path 28 that extends over a three-dimensional volume defined by orthogonal X, Y, and Z coordinates, hence covering the composite portion 10A containing the inner adhesive film layer 20, as shown. The scanner 24 thus reads data along horizontal X and Y axes, as well as along the vertical Z axis, as shown. The point cloud 32 is defined herein as a set of computer-generated data that may be stored, and later referenced for any desired subsequent automated processes, such as future applications of layers over honeycomb cores, etc.

For purposes of this disclosure, the definition of the point cloud 32 includes data points representing an "as designed" volume of the core-stiffened composite product 10, which may be digitally represented by a shape, contour, and/or geometry of the intended final composite product 10 (FIG. 1).

Finally, after being laminated together as a wet prepreg structure on the layup tool 11 (FIG. 1),each reversely identical composite portion 10A, 10B is cured in an autoclave 40 containing heating elements 42 (FIG. 2). Each composite portion 10A and 10B (although only 10A is shown in FIG. 2)may be separately removed from the autoclave 40, and adhesively joined together to form the final composite product 10 (FIG. 1).

Alternatively, the immediate disclosure may encompass fabrication of room temperature materials and prepreg laminate layers that do not require the described autoclave curing.

A process of making at least a portion 10A or 10B of the composite product 10 includes placing a first composite laminate 14 on a surface 13 of a layup tool 11; applying a first adhesive film layer over the laminate 14; applying a core 12 over the first adhesive film layer; applying a second layer of adhesive film 20 containing a visual target over the core 12; using an automated tracking system 26 to scan the visual target to generate spatial references in a point cloud 32 for accurate positioning of a second laminate layer 16; and placing the second laminate over the second layer of adhesive film 20 in accordance with scan-generated reference targets 22. The autoclave 40 is used in a final operation to cure the portion 10A or 10B.

Figure 6:
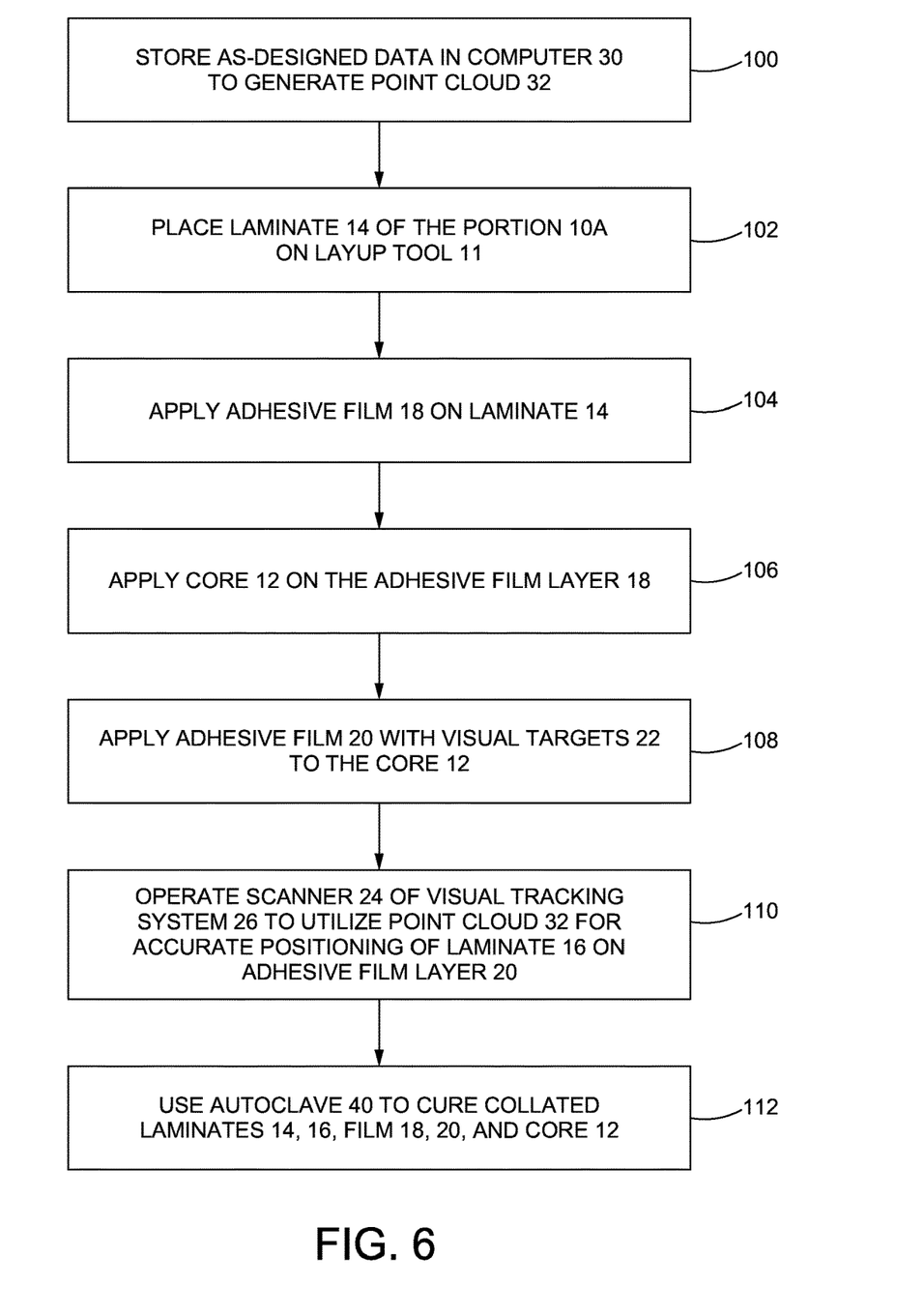
FIG. 6 is a flow chart depicting a series of steps for making an embodiment of the disclosed core-stiffened composite.

FIG. 6 provides a flow chart depicting exemplary steps for making an embodiment of the portion 10A or 10B of the disclosed core-stiffened composite 10. Thus, the portion 10A or 10B may be formed in accordance with the steps to accurately collate the interior core 12 with the layers of composite laminates 14, 16, the latter secured to and/or about the core 12 in the completed core-stiffened composite product 10. As has been noted, the completed core-stiffened composite product 10 contains the at least one layer of adhesive film 20 containing the visual targets 22 as used for the described spatial tracking.

As noted, dimensional accuracy of the "as built" core-stiffened composite product 10 is better assured via use of the automated tracking system 26, which spatially monitors the visual targets 22, and makes real time comparisons with "as designed" parameters of the point cloud 32. The "as designed" parameters thus constitute a predetermined frame of reference by which an "as-built" product 10 may be accurately replicated. For this purpose, the point cloud 32 provides an as-designed dimensionally corrected reference volume for comparison. As a result, any error data that is read by the scanner 24 with respect to any "as-built" work in process may be compared in real time against predetermined "as designed" parameters. Resulting positional corrections, as made by the tracking system 26 for example, will assure accurate collation; i.e. precision in placement and alignment, of the applied layers of laminates on and/or about the interior core 12. In summary, the point cloud 32 provides an effective reference tool for minimizing cumulative tolerance build-ups that may occur during a laminate layering process.

Finally, a specific sequence of steps, identified by boxes 100 through 112 of the flowchart of FIG. 6, may be generally described as follows:

Step 100: Store "as-designed" data in computer 30 to generate the point cloud 32;
Step 102: Place laminate 14 on the layup tool 11;
Step 104: Apply adhesive film 18 on the laminate 14;
Step 106: Apply the core 12 to the adhesive film layer 18;

Step 108: Apply adhesive film 20 (which contains visual targets 22) to the core 12;

Step 110: Operate the scanner 24 to utilize point cloud 32 to accurately position laminate 16 on the adhesive film layer 20; and Step 112: Use the autoclave 40 to cure the collated laminates 14, 16, the film 18, 20, and the core 12.

The disclosed core-stiffened product 10 and process for making may have other variations and alternative constructions neither described nor suggested herein. For example, although described only in terms of a few layers, the composite product may have a large plurality of layers sandwiched about the core, including Kevlar and other substantial and/or protective materials. Moreover, other configurations and/or other components may be utilized with such composite products, and in potentially in other environments, including space flight. Further, although the disclosure presents structures in only the shapes and sizes depicted, numerous variations of the disclosed structures may be envisioned for use in the manufacture of alternative embodiments.

What is claimed is:

1. A core-stiffened composite product comprising:
an interior core formed of a plurality of core components, each core component formed of a separate honeycomb structure, the core components being individually segmented and spaced apart;
layers of composite laminates sandwiched together about the interior core; and
at least one layer of adhesive film containing a visual target;
wherein the visual target is configured to be spatially scanned by an automated tracking system to produce a dimensionally corrected reference volume to collate successive layers of film as applied to the interior core, the visual target positioned to assure an as-designed alignment of each applied layer of laminate onto the interior core to minimize cumulative tolerance build-ups during a laminate layering process;
wherein the at least one layer of adhesive film remains within the completed core-stiffened composite product; and
wherein the core-stiffened composite product further includes exterior surfaces formed of layers of composite laminates, and the layers of composite laminates covering the adhesive film.

2. The core-stiffened composite product of claim 1, wherein the interior core has a thickness of about one order of magnitude greater than the thickness of any laminate layer within the composite product.

3. The core-stiffened composite product of claim 1, wherein the visual target is configured to be spatially scanned by an optical scanner.

4. The core-stiffened composite product of claim 3, wherein the visual target is configured to be spatially scanned by a laser scanner.

5. The core stiffened composite product of claim 1, wherein the at least one layer of adhesive film is configured to be cured in an autoclave.

6. The core stiffened composite product of claim 1, wherein the composite product comprises prepreg composite fibers not requiring heat for curing.

7. An aircraft component including a first core-stiffened composite product secured to a second core-stiffened composite product to form the aircraft component, the first and second core-stiffened composite products being reversely identical, each core-stiffened composite product comprising:
an interior core formed of a plurality of core components, each core component formed of a separate honeycomb structure, the core components being individually segmented and spaced apart;
layers of composite laminates sandwiched together about the interior core; and
at least one layer of adhesive film containing a visual target;
wherein the visual target is configured to be spatially scanned by an automated tracking system to produce a dimensionally corrected reference volume to collate successive layers of film as applied to the interior core, the visual target positioned to assure an as-designed alignment of each applied layer of laminate onto the interior core to minimize cumulative tolerance build-ups during a laminate layering process;
wherein the at least one layer of adhesive film remains within each of the core stiffened composite products of the completed aircraft component;
wherein the aircraft component further includes exterior surfaces formed of layers of composite laminates, and the layers of composite laminates covering the adhesive film; and
wherein the core components of the first core stiffened composite product are aligned with the core components of the second core-stiffened composite product when the first core-stiffened composite product is secured to the second core-stiffened composite product.

8. The aircraft component of claim 7, wherein the visual target is configured to be spatially scanned into a point cloud to generate the dimensionally corrected reference volume.

9. The aircraft component of claim 8, wherein the point cloud defines a computer-generated frame of reference for accurately applying the at least one layer of adhesive film to the core.

10. The aircraft component of claim 7, wherein the interior core has a thickness of about one order of magnitude greater than the thickness of any composite laminate layer within the composite product.

11. The aircraft component of claim 8, wherein the point cloud is used to make real-time comparisons of an as-built core stiffened composite product with a predetermined, as-designed composite product.

12. The aircraft component of claim 8, wherein the spatially scanned visual target is compared in real time against as-designed parameters for minimizing tolerance build-ups in the as-built component.

13. A process of manufacturing a lightweight aircraft core-stiffened composite product having an interior core and layers of laminates sandwiched about the interior core, the process including the steps of:
placing a first prepreg laminate layer on a work surface of a composite layup tool;
placing a first adhesive layer over the first prepreg laminate;
placing the interior core over the first laminate, the interior core formed of a plurality of core components, each core component formed of a separate honeycomb structure, the core components being individually segmented and spaced apart;
applying a second adhesive layer over the interior core, the second adhesive layer containing a visual laser target, and wherein the second adhesive layer remains within the core-stiffened composite product;
using an optical scanner to track the visual target to generate a spatial reference for accurate positioning of a second prepreg laminate layer; and placing the second prepreg laminate layer over the second adhesive layer in accordance with a dimensionally corrected reference volume generated by the optical scanner, such that exterior surfaces of layers of composite laminates are formed on the core-stiffened composite product, with the layers of composite laminates covering the adhesive layers.

14. The process of claim 13, wherein using the optical scanner comprises providing a tracked reference in three orthogonal dimensions for positioning of the second prepreg laminate layer.

15. The process of claim 14, wherein using the optical scanner comprises reading along a visual tracking sight path having X and Y dimensions, and wherein the optical scanner also reads vertically along a Z dimension.

16. The process of claim 13, further comprising the core stiffened product including the visual target is cured in an autoclave.

17. The process of claim 13, further comprising curing the core-stiffened product without application of heat.

* * * * *